(12) United States Patent
Zhu et al.

(10) Patent No.: US 11,428,215 B2
(45) Date of Patent: Aug. 30, 2022

(54) VEHICLE-MOUNTED ELECTRIC OIL-FREE AIR COMPRESSOR

(71) Applicant: Ruili Group Ruian Auto Parts Co., Ltd, Wenzhou (CN)

(72) Inventors: Bin Zhu, Wenzhou (CN); Chuanwu Li, Wenzhou (CN); Shengbo Zhou, Wenzhou (CN); Zhoule Zhong, Wenzhou (CN)

(73) Assignee: RUILI GROUP RUIAN AUTO PARTS CO., LTD, Wenzhou (CN)

( * ) Notice: Subject to any disclaimer, the term of this patent is extended or adjusted under 35 U.S.C. 154(b) by 0 days.

(21) Appl. No.: 15/734,666

(22) PCT Filed: Sep. 3, 2019

(86) PCT No.: PCT/CN2019/104095
§ 371 (c)(1),
(2) Date: Dec. 3, 2020

(87) PCT Pub. No.: WO2020/078125
PCT Pub. Date: Apr. 23, 2020

(65) Prior Publication Data
US 2021/0222684 A1    Jul. 22, 2021

(30) Foreign Application Priority Data
Oct. 17, 2018    (CN) .......................... 201811210518.2

(51) Int. Cl.
*F04B 25/02* (2006.01)
*F04B 35/04* (2006.01)
(Continued)

(52) U.S. Cl.
CPC ................ *F04B 25/02* (2013.01); *F04B 5/02* (2013.01); *F04B 35/04* (2013.01);
(Continued)

(58) Field of Classification Search
CPC ........ F04B 39/0016; F04B 5/02; F04B 25/02; F04B 53/123; F04B 53/127; F04B 35/04;
(Continued)

(56) References Cited

U.S. PATENT DOCUMENTS 1,488,683 A * 4/1924 Juruick ................... F25B 31/00
                                                           417/261
1,817,853 A * 8/1931 Small .................. F04B 39/0016
                                                           417/511
(Continued)

FOREIGN PATENT DOCUMENTS

CN    205330969 U    6/2016
CN    107575359 A    1/2018
(Continued)

OTHER PUBLICATIONS

International Search Report issued in corresponding International Application No. PCT/CN2019/104095; dated Dec. 2, 2019; 6 pgs.

*Primary Examiner* — Christopher S Bobish
(74) *Attorney, Agent, or Firm* — Hauptman Ham, LLP (57) ABSTRACT

A vehicle-mounted electric oil-free air compressor, including a motor, a box body, a piston, and a flywheel shaft. The motor is fixed on the box body, a cylinder cover is at the top of the box body, a main shaft of the motor includes a coupling driving end, the flywheel shaft is driven by an elastic body to rotate. The piston includes a primary intake valve piece and a primary exhaust valve piece, the box body is provided with a secondary cavity, a secondary exhaust valve piece is provided at a vent hole on one side of the cavity, and the primary exhaust valve piece is also a secondary intake valve piece of the compressor, increasing the exhaust pressure. When the piston reciprocates, the stress is balanced and the vibration is small, and with the assistance of a high-efficiency flywheel, the operation of the air compressor is stable.

19 Claims, 4 Drawing Sheets

(51) Int. Cl.
*F04B 39/00* (2006.01)
*F16F 15/315* (2006.01)
*F04B 53/12* (2006.01)
*F16F 15/28* (2006.01)
*F04B 5/02* (2006.01)

(52) U.S. Cl.
CPC ...... *F04B 39/0005* (2013.01); *F04B 39/0016* (2013.01); *F04B 39/0022* (2013.01); *F04B 39/0094* (2013.01); *F04B 53/123* (2013.01); *F04B 53/127* (2013.01); *F16F 15/28* (2013.01); *F16F 15/283* (2013.01); *F16F 15/315* (2013.01); *F16F 15/3153* (2013.01)

(58) Field of Classification Search
CPC .............. F04B 39/0005; F04B 39/0022; F04B 39/0094; F16F 15/3153; F16F 15/315; F16F 15/28; F16F 15/283
USPC ........................................ 417/260, 261, 262
See application file for complete search history.

(56) References Cited

U.S. PATENT DOCUMENTS

| | | | | | |
|---|---|---|---|---|---|
| 1,840,265 | A | * | 1/1932 | Spohrer | F04B 39/064 417/243 |
| 2,403,814 | A | * | 7/1946 | Maniscalco | F04B 39/066 417/243 |
| 2,430,401 | A | * | 11/1947 | Hunt | F04B 25/02 417/259 |
| 2,843,312 | A | * | 7/1958 | Maniscalco, Sr. | F04B 27/12 417/261 |
| T883,011 | I4 | * | 2/1971 | Miller | F04B 39/0016 417/259 |
| 4,657,488 | A | * | 4/1987 | Weinhandl | F04B 25/02 417/267 |
| 4,842,489 | A | * | 6/1989 | Lucisano | F04B 33/005 417/238 |
| 5,279,183 | A | * | 1/1994 | Forster | F02B 75/06 403/359.4 |
| 6,193,482 | B1 | * | 2/2001 | Chen | F04B 39/0016 417/545 |
| 6,648,612 | B2 | * | 11/2003 | Hsiao | F04B 39/0016 417/313 |
| 7,329,105 | B2 | * | 2/2008 | Schaake | B60T 17/02 417/534 |
| 8,657,588 | B2 | * | 2/2014 | Lund | F04B 9/06 417/258 |
| 9,856,866 | B2 | * | 1/2018 | Moore | F04B 25/005 |
| 2007/0237662 | A1 | * | 10/2007 | Kippes | F04B 39/0016 417/546 |

FOREIGN PATENT DOCUMENTS

| | | |
|---|---|---|
| CN | 107917059 | 4/2018 |
| CN | 108167157 A | 6/2018 |
| CN | 108539891 A | 9/2018 |
| CN | 207813852 U | 9/2018 |
| CN | 109404248 A | 3/2019 |

* cited by examiner

VEHICLE-MOUNTED ELECTRIC OIL-FREE AIR COMPRESSOR

RELATED APPLICATIONS

The present application is a National Phase of International Application Number PCT/CN2019/104095, filed Sep. 3, 2019, and claims the priority of China Application No. 201811210518.2, filed Oct. 17, 2018.

TECHNICAL FIELD

The present invention relates to the technical field of air compressors, and in particular, to a vehicle-mounted electric oil-free air compressor.

BACKGROUND

Vehicle air compressors are mainly used for providing necessary air sources for vehicle braking technologies, air suspension systems, and door opening and closing and auxiliary pneumatic apparatuses. Because a vehicle has a limited space, it is difficult to arrange a large air compressor. Therefore, a lot of vehicles employ a small-size single-cylinder model. However, single-cylinder piston type air compressors have inherent structural defects, and are difficult to balance under stress, the running vibration is large and the service life is short. With the implementation of new national standard GB7258, higher requirements are proposed for exhaust pressure. A piston doing reciprocating movements includes compression and intake stages. As the exhaust pressure rises, the compression force of the piston increases, so that the stress is more unbalanced, and the running vibration is further enhanced.

For example, Chinese utility model patent with authorized announcement No. CN205330969U discloses a vehicle-mounted direct-current direct-drive oil-free scroll air compressor, including a fixed scroll, an orbiting scroll, a compressor crankshaft, and a bearing base. A direct-current synchronous permanent magnet motor includes a motor body and a motor shaft; the compressor crankshaft is mounted in the bearing base; an input end of the compressor crankshaft is in snap connection with an output end of the motor shaft through a spline; an output end of the compressor crankshaft is fixedly connected with the orbiting scroll; one end of the bearing base is connected with the motor body through a bolt, and the other end of the bearing base is connected with the fixed scroll through a bolt. According to the vehicle-mounted direct-current direct-drive oil-free scroll air compressor provided in the present utility model, the oil-free scroll air compressor and the direct-current synchronous permanent magnet motor are two independent parts, the motor shaft is in snap connection with the compressor crankshaft through the spline, and the driving force is transmitted directly to the compressor crankshaft through the motor shaft, so that the driving efficiency is high, and maintenance is facilitated. Since the fixed scroll is provided with an accommodating cavity, the overall volume is reduced. However, the compressor and the motor are independent of each other, and therefore, the occupied area is large, and the overall stress is unbalanced.

For another example, Chinese invention patent with the publication No. CN107917059A discloses an electrically-driven oil-free piston air compressor for a vehicle, including a motor, a motor spindle, a crankcase, a flywheel shaft, and a connecting rod. For the crankcase and piston cylinders, two piston cylinders are horizontally arranged on the two sides of the crankcase, and exhaust valve plates are mounted on the outer sides of the two piston cylinders; the motor is secured to the tail of the crankcase through a bolt; the motor spindle directly drives the flywheel shaft to rotate, and the flywheel shaft is mounted in the crankcase through a load bearing support bearing, so that the bearing load of a front end of the motor is small, the service life of the motor is prolonged, and the motor has the advantages of low noise and high reliability. However, in the invention, there are provided with two piston cylinders, and the exhaust pressure increases, and compression force of the piston increases, but the stress is more unbalanced.

SUMMARY

In order to solve the aforementioned existing technical defects in the prior art, the present invention aims to provide a vehicle-mounted electric oil-free air compressor which integrates a double-acting piston with primary and secondary compression functions to improve the exhaust pressure. When the piston reciprocates, the stress is balanced and the vibration is small, and with the assistance of the high-efficiency flywheel, the operation of the air compressor is stable.

In order to achieve the above design objective, the solutions adopted by the present invention are as follows.

A vehicle-mounted electric oil-free air compressor includes a motor, a box body, a piston, and a flywheel shaft, wherein the motor is fixed on the box body, and a cylinder cover is provided at the top of the box body; a main shaft of the motor is provided with a coupling driving end, and the flywheel shaft is driven by an elastic body to rotate; the piston is provided with a primary intake valve piece and a primary exhaust valve piece; and the box body is provided with a secondary cavity, and a secondary exhaust valve piece is provided at a vent hole on one side of the cavity. The primary exhaust valve piece is also a secondary intake valve piece of the compressor. When the piston reciprocates once, the primary compression piston force and the secondary compression piston force act alternately on the same piston, the stress of the piston is balanced and offsets from each other, the torsion output of a transmission shaft is balanced, and the operation of the whole machine is stable and the vibration is small.

The working process of the vehicle-mounted electric oil-free air compressor in the present invention is as follows.

A power source is provided by a motor, a flywheel shaft is directly driven through an elastomer coupling to rotate, and a piston connecting rod placed on a crank vertically reciprocates. The piston is provided with a primary intake valve piece and a primary exhaust valve piece (the secondary intake valve piece), and a secondary exhaust valve piece is provided at a vent hole on one side of the secondary cavity on the box body. When the piston moves from a top dead point to a bottom dead point, the volume of the primary cavity gradually increases to generate negative pressure, and air is sucked into the primary cavity. Meanwhile, the volume of the secondary cavity gradually reduces, the air is compressed, and the air pressure rises until the secondary exhaust valve piece is pushed to discharge air. In this case, secondary compression of the air is completed in the secondary cavity. When the piston moves from the bottom dead point to the top dead point, the volume of the primary cavity gradually reduces, the air is compressed, and the pressure rises to push the primary intake valve piece into the secondary cavity. Meanwhile, the volume of the secondary cavity gradually increases, and the air compressed by the primary cavity is sucked. The motor rotates once, the piston reciprocates once, and the air is compressed twice, as shown in an indicator diagram of an airflow direction: air is sucked from the atmosphere, passes through the air filter, the crankcase, and a piston vent hole, completes primary compression in the primary cavity and secondary compression in the secondary cavity sequentially, and then is discharged. The aforementioned process repeatedly causes the air to be continuously compressed and discharged. When the piston reciprocates once, the primary compression piston force and the secondary compression piston force act alternately on the same piston, the stress of the piston is balanced and offsets from each other, the torsion output of a transmission shaft is balanced, and the operation of the whole machine is stable and the vibration is small.

Preferably, the lower side of the primary exhaust valve piece is an elastic washer, which is fixed on the piston through a ventilation bolt.

In any of the above solutions, preferably, the elastic washer is selected from a wave washer, a butterfly washer, or an O-ring.

In any of the above solutions, preferably, the ventilation bolt is selected from an inner hexagon bolt, an inner hexagon flower bolt, or an inner cross bolt.

In any of the above solutions, preferably, the primary intake valve piece is fixed to the upper side of a valve plate through an inner ventilation bolt.

In any of the above solutions, preferably, the flywheel shaft is placed in the box body through a maintenance-free rolling bearing for load bearing and is provided with an anti-loose upper check ring and an anti-loose lower check ring.

In any of the above solutions, preferably, the flywheel shaft is provided with a crank structure for placing a bearing, and a tail end of the crank is provided with an end check ring groove.

In any of the above solutions, preferably, a flywheel on a collar side of the flywheel shaft is provided with a shaft diameter and a check ring groove for placing a support bearing.

In any of the above solutions, preferably, a plurality of balance weight-reducing holes are provided on the shaft end face of the flywheel shaft for balancing the centrifugal inertia force and torque of a piston connecting rod; and the shaft tail end of the flywheel shaft is internally provided with a claw-shaped driven end for completing torque transfer in cooperation with the elastic body and the coupling driving end. A small-displacement air compressor may directly drive a flywheel shaft through a motor shaft, or employ belt pulleys, and electromagnetic and hydraulic modes, and a pneumatic clutch is driven by an engine shaft.

In any of the above solutions, preferably, the crank of the flywheel shaft is provided with a maintenance-free rolling bearing and an anti-loose check ring; an outer ring of the maintenance-free rolling bearing is provided with a connecting rod; and a rolling bearing is provided in a small end of the connecting rod and is driven to the piston through a piston pin.

The size of the flywheel shaft is small, and the counterweight is balanced; elastic transmission is employed for buffer damping, thereby prolonging the service life; and the flywheel functions are integrated, and the operation is stable and reliable.

In any of the above solutions, preferably, a guide ring for guiding and supporting and a first piston ring and a second piston ring having an air sealing function for the secondary cavity are provided on the side face of the piston. Use of a self-lubricating material piston ring, the guide ring, and a maintenance-free grease lubrication bearing realizes oil-free compression, so that an air source is cleaner.

In any of the above solutions, preferably, an end face of the piston is provided with a cup seal integrating a primary cavity sealing function and a guiding and supporting function, the valve plate is provided on the upper side of the cup seal, and the primary exhaust valve piece is provided on the lower side of the valve plate. A small-displacement air compressor may also employ a cup seal without a guiding and supporting function and a valve plate structure, and the primary intake valve piece and the primary exhaust valve piece may also be directly mounted on the piston.

In any of the above solutions, preferably, the end face of the piston is further provided with a plurality of inner ventilation bolt mounting holes; and a valve piece fixed-range boss structure is provided at a central region of the end face of the piston, and a plurality of exhaust channels are uniformly provided on the ring side of the boss structure.

In any of the above solutions, preferably, the side face of the piston is sequentially provided with a first piston ring, a second piston ring, and a guide ring mounting groove from top to bottom.

In any of the above solutions, preferably, a piston pin mounting hole is provided at the bottom of the piston, and a threaded opening for bolt fixation is provided on the outer side of the mounting hole.

In any of the above solutions, preferably, a front end of the box body is further provided with an intake cover, an air filter is provided in the intake cover, and the inner side of the filter is a flow-stabilizing one-way valve.

In any of the above solutions, preferably, a cooling fan is provided above the motor on the outer side surface of the box body, or a front side crankshaft of the box body directly drives a flow guide cover provided on the outer side or drives same through a magnetic coupling.

In any of the above solutions, preferably, the outer side of the secondary exhaust valve piece is an exhaust fixed-range plate which is fastened by an exhaust joint.

In any of the above solutions, preferably, the secondary exhaust valve piece is made of a stainless steel metallic material or a peek non-metallic material.

In any of the above solutions, preferably, the secondary exhaust valve piece is of an annular structure, a central region of the annular structure is an airflow impact sealing region, and the sealing region is connected with an annular force arm.

In any of the above solutions, preferably, a bolt mounting through hole is provided on the outer side of the secondary exhaust valve piece.

DETAILED DESCRIPTION

The following descriptions are merely illustrative actually, and are not intended to limit the present disclosure and applications or uses thereof. The specific implementations of the vehicle-mounted electric oil-free air compressor in the present invention are further described below in combination with the accompanying drawings of the description.

Figure 1:
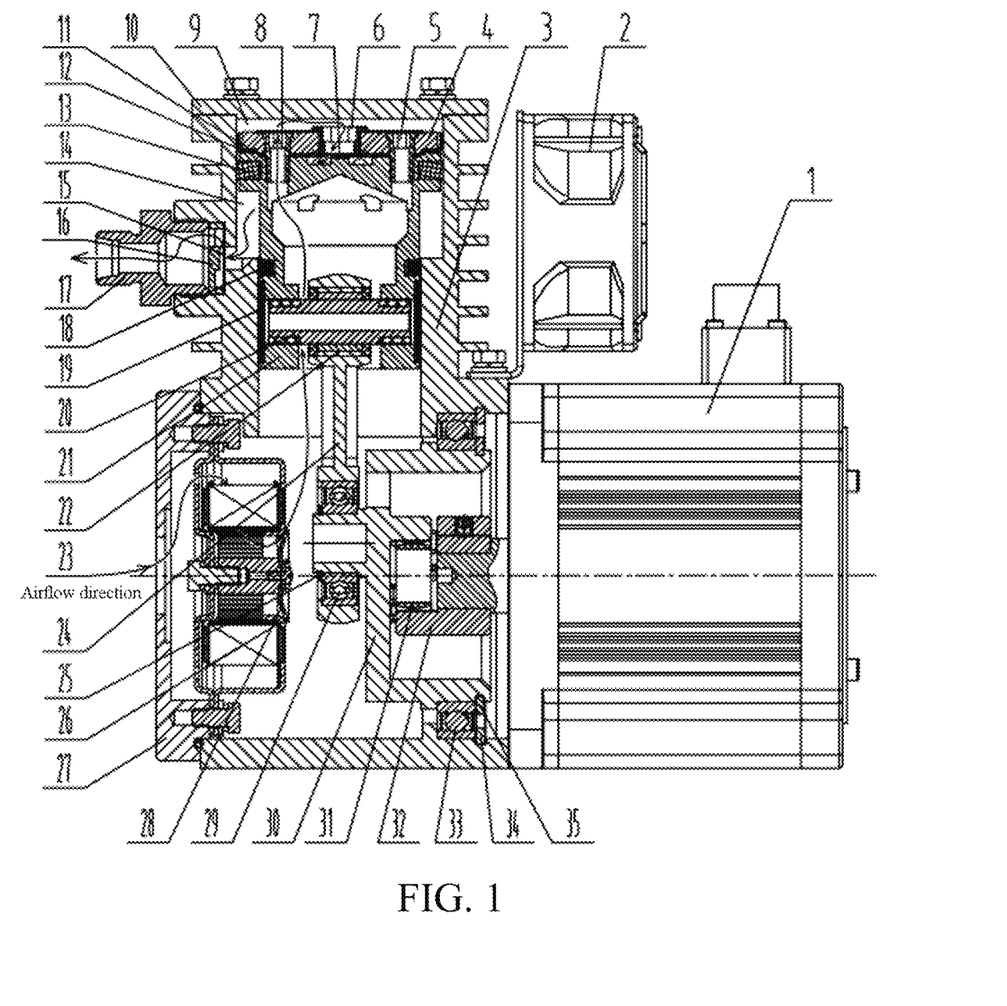
FIG. 1 is a schematic structural diagram of a preferred embodiment of a vehicle-mounted electric oil-free air compressor according to the present invention.

FIG. 1 illustrates a schematic structural diagram of a preferred embodiment of a vehicle-mounted electric oil-free air compressor according to the present invention. The vehicle-mounted electric oil-free air compressor in the present invention includes a motor 1, a box body 3, a piston 21, and a flywheel shaft 30, wherein the motor 1 is fixed on the box body 3, and a cylinder cover 10 is provided at the top of the box body 3; a main shaft of the motor 1 is provided with a coupling driving end 32, and the flywheel shaft 30 is driven by an elastic body 31 to rotate; the piston 21 is provided with a primary intake valve piece 8 and a primary exhaust valve piece 7; and the box body 3 is provided with a secondary cavity 14, and a secondary exhaust valve piece 15 is provided at a vent hole on one side of the cavity. The primary exhaust valve piece 7 is also a secondary intake valve piece of the compressor. When the piston reciprocates once, the primary compression piston force and the secondary compression piston force act alternately on the same piston 21, the stress of the piston 21 is balanced and offsets from each other, the torsion output of a transmission shaft is balanced, and the operation of the whole machine is stable and the vibration is small.

The working process of the vehicle-mounted electric oil-free air compressor in the present invention is as follows.

A power source is provided by a motor 1, a flywheel shaft 30 is directly driven through an elastomer coupling 31 to rotate, and a piston connecting rod placed on a crank vertically reciprocates. The piston 21 is provided with a primary intake valve piece 8 and a primary exhaust valve piece (the secondary intake valve piece) 7, and a secondary exhaust valve piece 15 is provided at a vent hole on one side of the secondary cavity 14 on the box body 3. When the piston moves from a top dead point to a bottom dead point, the volume of the primary cavity 9 gradually increases to generate negative pressure, and air is sucked into the primary cavity 9. Meanwhile, the volume of the secondary cavity 14 gradually reduces, the air is compressed, and the air pressure rises until the secondary exhaust valve piece 15 is pushed to discharge air. In this case, secondary compression of the air is completed in the secondary cavity 14. When the piston 21 moves from the bottom dead point to the top dead point, the volume of the primary cavity 9 gradually reduces, the air is compressed, and the pressure rises to push the primary exhaust valve piece 7 into the secondary cavity 14. Meanwhile, the volume of the secondary cavity 14 gradually increases, and the air compressed by the primary cavity 9 is sucked. The motor 1 rotates once, the piston reciprocates once, and the air is compressed twice, as shown in an indicator diagram of an airflow direction 23: air is sucked from the atmosphere, passes through the air filter, the crankcase, and the piston vent hole, the primary compression is completed in the primary cavity and the secondary compression and discharge are completed in the secondary cavity sequentially. The aforementioned process repeatedly causes the air to be continuously compressed and discharged. When the piston reciprocates once, the primary compression piston force and the secondary compression piston force act alternately on the same piston, the stress of the piston is balanced and offsets from each other, the torsion output of a transmission shaft is balanced, and the operation of the whole machine is stable and the vibration is small.

In this embodiment, the lower side of the primary exhaust valve piece 7 is an elastic washer 11 which is fixed on the piston 21 through a ventilation bolt 5.

In this embodiment, the elastic washer 11 is selected from a wave washer, a butterfly washer, or an O-ring.

In this embodiment, the ventilation bolt 5 is selected from an inner hexagon bolt, an inner hexagon flower bolt, or an inner cross head bolt.

In this embodiment, the primary intake valve piece 8 is fixed to the upper side of a valve plate 4 through an inner ventilation bolt 6.

Figure 2:
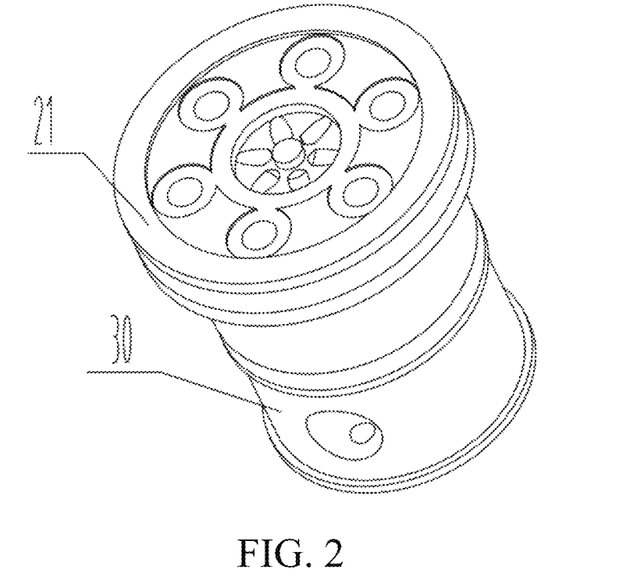
FIG. 2 is a schematic structural diagram of a flywheel shaft a piston in the preferred embodiment shown in FIG. 1 of the vehicle-mounted electric oil-free air compressor according to the present invention.
Figure 3:
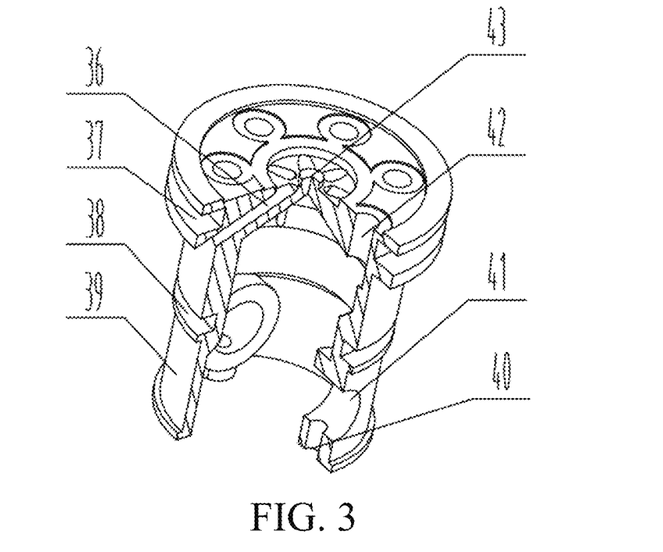
FIG. 3 is a sectional view of an internal structure of the flywheel shaft in the preferred embodiment shown in FIG. 2 of the vehicle-mounted electric oil-free air compressor according to the present invention.

FIGS. 2 and 3 illustrate a schematic structural diagram of a flywheel shaft in the preferred embodiment shown in FIG. 1 of the vehicle-mounted electric oil-free air compressor according to the present invention.

In this embodiment, the flywheel shaft 30 is placed in the box body 3 through a maintenance-free rolling bearing 33 for load bearing and is provided with an anti-loose upper check ring 34 and an anti-loose lower check ring 35.

In this embodiment, the flywheel shaft 30 is provided with a crank 45 structure for placing a bearing, and a tail end of the crank is provided with an end check ring groove 46.

In this embodiment, a flywheel on a collar side of the flywheel shaft 30 is provided with a shaft diameter 47 and a check ring groove 48 for placing a support bearing.

In this embodiment, a plurality of balance weight-reducing holes 44 are provided on the shaft end face of the flywheel shaft 30 for balancing the centrifugal inertia force and torque of a piston connecting rod; and the shaft tail end of the flywheel shaft 30 is internally provided with a claw-shaped driven end 49 for completing torque transfer in cooperation with the elastic body 31 and the coupling driving end 32. A small-displacement air compressor may directly drive a flywheel shaft through a motor shaft, or employ belt pulleys, and electromagnetic and hydraulic modes, and a pneumatic clutch is driven by an engine shaft.

In this embodiment, the crank of the flywheel shaft 30 is provided with a maintenance-free rolling bearing 29 and an anti-loose check ring 25; an outer ring of the maintenance-free rolling bearing 29 is provided with a connecting rod 24; and a rolling bearing 22 is provided in a small end of the connecting rod and is driven to the piston 21 through a piston pin 20.

The size of the flywheel shaft 30 is small, and the counterweight is balanced; elastic transmission is employed for buffer damping, thereby prolonging the service life; and the flywheel functions are integrated, and the operation is stable and reliable.

Figure 4:
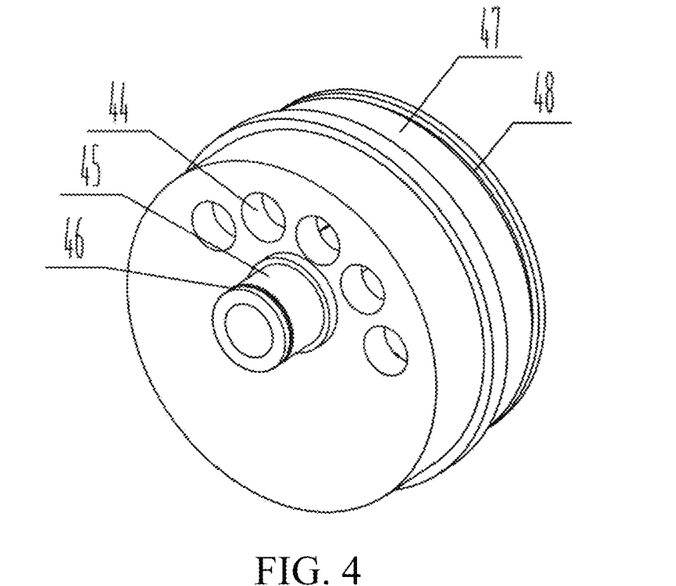
FIG. 4 is a schematic structural diagram of a piston in the preferred embodiment shown in FIG. 1 of the vehicle-mounted electric oil-free air compressor according to the present invention.
Figure 5:
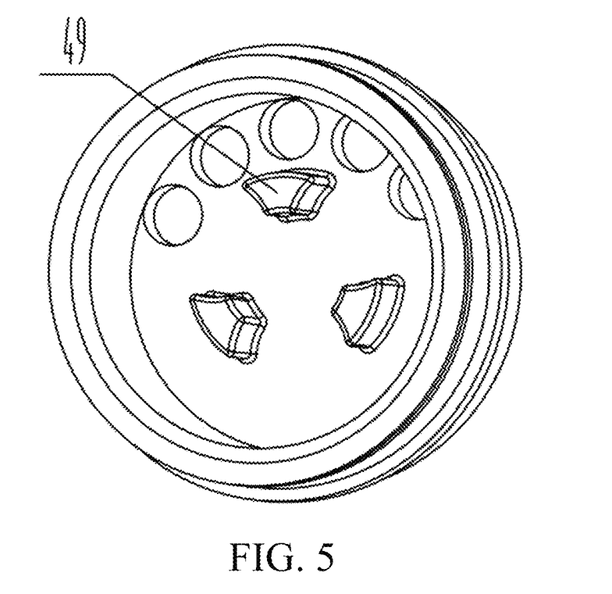
FIG. 5 is a schematic diagram of the piston in the preferred embodiment shown in FIG. 1 of the vehicle-mounted electric oil-free air compressor according to the present invention.

FIGS. 4 and 5 illustrate a schematic structural diagram of a piston in the preferred embodiment shown in FIG. 1 of the vehicle-mounted electric oil-free air compressor according to the present invention.

In this embodiment, a guide ring 19 for guiding and supporting and a first piston ring 13 and a second piston ring 18 having an air sealing function for the secondary cavity are provided on the side face of the piston 21. Use of a self-lubricating material piston ring, the guide ring, and a maintenance-free grease lubrication bearing realizes oil-free compression, so that an air source is cleaner.

In this embodiment, an end face of the piston 21 is provided with a cup seal 12 integrating a primary cavity sealing function and a guiding and supporting function, the valve plate 4 is provided on the upper side of the cup seal, and the primary exhaust valve piece 7 is provided on the lower side of the valve plate. A small-displacement air compressor may also employ a cup seal 12 without a guiding and supporting function and a valve plate 4 structure, and the primary intake valve piece 8 and the primary exhaust valve piece 7 may also be directly mounted on the piston 21.

In this embodiment, the end face of the piston 21 is further provided with a plurality of inner ventilation bolt mounting holes 42; and a valve piece fixed-range boss structure 43 is provided at a central region of the end face of the piston 21, and a plurality of exhaust channels 36 are uniformly provided on the ring side of the boss structure.

In this embodiment, the side face of the piston 21 is sequentially provided with a first piston ring 37, a second piston ring 38, and a guide ring mounting groove 39 from top to bottom.

In this embodiment, a piston pin mounting hole 41 is provided at the bottom of the piston 21, and a threaded opening 40 for bolt fixation is provided on the outer side of the mounting hole.

In this embodiment, a front end of the box body 3 is further provided with an air intake cover 27, an air filter 26 is provided in the air intake cover, and the inner side of the filter is a steady flow one-way valve 28.

In this embodiment, a cooling fan 2 is provided above the motor on the outer side surface of the box body 3, or a front side crankshaft of the box body 3 directly drives a flow guide cover provided on the outer side or drives same through a magnetic coupling.

Figure 6:
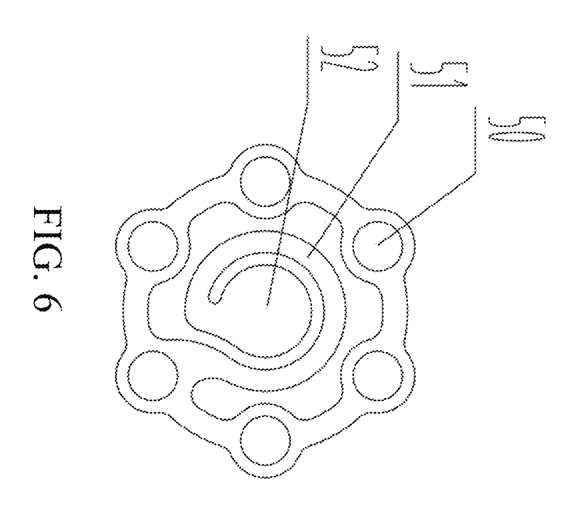
FIG. 6 is a schematic structural diagram of an exhaust valve piece in the preferred embodiment shown in FIG. 1 of the vehicle-mounted electric oil-free air compressor according to the present invention.

FIG. 6 illustrates a schematic structural diagram of an exhaust valve piece in the preferred embodiment shown in FIG. 1 of the vehicle-mounted electric oil-free air compressor according to the present invention.

In this embodiment, the outer side of the secondary exhaust valve piece 15 is an exhaust fixed-range plate 16, which is fastened by an exhaust joint 17.

In this embodiment, the secondary exhaust valve piece 15 is made of a stainless steel metallic material or a peek non-metallic material.

In this embodiment, the secondary exhaust valve piece 15 is of an annular structure, a central region of the annular structure is an airflow impact sealing region 52, and the sealing region is connected with an annular force arm 51.

In this embodiment, a bolt mounting through hole 50 is provided on the outer side of the secondary exhaust valve piece 15.

A person skilled in the art would easily understand that the vehicle-mounted electric oil-free air compressor in the present invention includes any combination of parts of this description. These combinations are not described in detail herein for the sake of conciseness of the description. However, after reading this description, the scope of the present invention, which consists of any combination of the parts of this description, has been obvious.

What is claimed is:

1. A vehicle-mounted electric oil-free air compressor, comprising a motor, a box body, a piston, and a flywheel shaft, wherein the motor is fixed on the box body, a cylinder cover is provided at the top of the box body, a main shaft of the motor is provided with a coupling driving end, the flywheel shaft is driven by an elastic body to rotate, wherein the piston is provided with a primary intake valve piece and a primary exhaust valve piece, the box body is provided with a secondary cavity, and a secondary exhaust valve piece is provided at a vent hole on one side of the cavity, wherein a plurality of balance weight-reducing holes are provided on a shaft end face of the flywheel shaft for balancing the centrifugal inertia force and torque of a piston connecting rod; and a shaft tail end of the flywheel shaft is internally provided with a claw-shaped driven end for completing torque transfer in cooperation with the elastic body and the coupling driving end.

2. The vehicle-mounted electric oil-free air compressor according to claim 1, wherein the primary exhaust valve piece is also a secondary intake valve piece of the compressor.

3. The vehicle-mounted electric oil-free air compressor according to claim 1, wherein a lower side of the primary exhaust valve piece is an elastic washer, which is fixed on the piston through a ventilation bolt.

4. The vehicle-mounted electric oil-free air compressor according to claim 3, wherein the elastic washer is selected from a wave washer, a butterfly washer, or an O-ring.

5. The vehicle-mounted electric oil-free air compressor according to claim 3, wherein the ventilation bolt is selected from an inner hexagon bolt, an inner hexagon flower bolt, or an inner cross bolt.

6. The vehicle-mounted electric oil-free air compressor according to claim 1, wherein the primary intake valve piece is fixed to an upper side of a valve plate through an inner ventilation bolt.

7. The vehicle-mounted electric oil-free air compressor according to claim 1, wherein the flywheel shaft is placed in the box body through a rolling bearing for load bearing and is provided with an anti-loose upper check ring and an anti-loose lower check ring.

8. The vehicle-mounted electric oil-free air compressor according to claim 1, wherein the flywheel shaft is provided with a crank structure for placing a bearing, and a tail end of the crank is provided with an end check ring groove.

9. The vehicle-mounted electric oil-free air compressor according to claim 1, wherein a flywheel on a collar side of the flywheel shaft is provided with a shaft diameter and a check ring groove for placing a support bearing.

10. The vehicle-mounted electric oil-free air compressor according to claim 8, wherein the crank of the flywheel shaft is provided with a rolling bearing and an anti-loose check ring; an outer ring of the rolling bearing is provided with a connecting rod; and a rolling bearing is provided in a small end of the connecting rod and is driven to the piston through a piston pin.

11. The vehicle-mounted electric oil-free air compressor according to claim 1, wherein a guide ring for guiding and supporting and a first piston ring and a second piston ring having an air sealing function for the secondary cavity are provided on a side face of the piston.

12. The vehicle-mounted electric oil-free air compressor according to claim 1, wherein an end face of the piston is provided with a cup seal integrating a primary cavity sealing function and a guiding and supporting function, a valve plate is provided on an upper side of the cup seal, and the primary exhaust valve piece is provided on a lower side of the valve plate.

13. The vehicle-mounted electric oil-free air compressor according to claim 1, wherein an end face of the piston is further provided with a plurality of inner ventilation bolt mounting holes; and a valve piece fixed-range boss structure is provided at a central region of the end face of the piston, and a plurality of exhaust channels are uniformly provided on a ring side of the boss structure.

14. The vehicle-mounted electric oil-free air compressor according to claim 1, wherein a side of the piston is sequentially provided with a first piston ring, a second piston ring, and a guide ring mounting groove from top to bottom.

15. The vehicle-mounted electric oil-free air compressor according to claim 1, wherein a piston pin mounting hole is provided at a bottom of the piston, and a threaded opening for bolt fixation is provided on an outer side of the mounting hole.

16. The vehicle-mounted electric oil-free air compressor according to claim 1, wherein a front end of the box body is further provided with an air intake cover, an air filter is provided in the air intake cover, and an inner side of the filter is a steady flow one-way valve.

17. The vehicle-mounted electric oil-free air compressor according to claim 1, wherein a cooling fan is provided above the motor on an outer side surface of the box body.

18. The vehicle-mounted electric oil-free air compressor according to claim 1, wherein an outer side of the secondary exhaust valve piece is an exhaust fixed-range plate, and is fastened by an exhaust joint.

19. The vehicle-mounted electric oil-free air compressor according to claim 1, wherein the secondary exhaust valve piece is made of a stainless steel metallic material or a peek non-metallic material.

* * * * *